United States Patent
Masuda et al.

(10) Patent No.: US 8,229,429 B2
(45) Date of Patent: Jul. 24, 2012

(54) POSITION REGISTERING METHOD, RADIO CONTROL STATION, AND EXCHANGE

(75) Inventors: Masafumi Masuda, Yokosuka (JP); Takaaki Sato, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/937,038

(22) PCT Filed: Apr. 8, 2009

(86) PCT No.: PCT/JP2009/057218
§ 371 (c)(1),
(2), (4) Date: Jan. 4, 2011

(87) PCT Pub. No.: WO2009/125797
PCT Pub. Date: Oct. 15, 2009

(65) Prior Publication Data
US 2011/0092205 A1    Apr. 21, 2011

(30) Foreign Application Priority Data
Apr. 9, 2008 (JP) .................. P2008-101988

(51) Int. Cl.
*H04W 4/00* (2009.01)
*H04W 24/00* (2009.01)
(52) U.S. Cl. ............... 455/435.1; 455/456.1; 455/456.6
(58) Field of Classification Search ............. 455/418, 455/404.2, 415, 433, 456.1–456.3, 456.5–456.6, 455/458, 515, 517, 550.1, 556.2, 435.1–435.2, 455/560–561
See application file for complete search history.

(56) References Cited

U.S. PATENT DOCUMENTS

| | | | | |
|---|---|---|---|---|
| 7,113,784 | B2 * | 9/2006 | Fujiwara et al. | 455/435.1 |
| 7,519,052 | B2 * | 4/2009 | Aoki et al. | 370/356 |
| 7,941,142 | B2 * | 5/2011 | Aikawa et al. | 455/435.1 |
| 2003/0013444 | A1 * | 1/2003 | Watanabe et al. | 455/435 |
| 2003/0065664 | A1 * | 4/2003 | Akazawa et al. | 707/10 |
| 2003/0090945 | A1 * | 5/2003 | Kwon et al. | 365/200 |
| 2004/0139320 | A1 * | 7/2004 | Shinohara | 713/168 |

(Continued)

FOREIGN PATENT DOCUMENTS

JP    2005 109570    4/2005

(Continued)

OTHER PUBLICATIONS

International Search Report issued May 26, 2009 in PCT/JP09/57218 filed Apr. 8, 2009.

*Primary Examiner* — Meless Zewdu
(74) *Attorney, Agent, or Firm* — Oblon, Spivak, McClelland, Maier & Neustadt, L.L.P.

(57) ABSTRACT

In a position registering method, a radio control station (RNC) transmits report information including a first position number, which has been extracted by using a cell identifier as key information, to the cell identified by the cell identifier. A mobile station (UE) transmits a position registration request when the first position number included in the report information is different from a position number stored in the mobile station. The radio control station (RNC) notifies the first position number and the second position number, which have been extracted by using as the key information the cell identifier for identifying the requester of the position registration request, and a user identifier for identifying the mobile station. An exchange (MSC/SGSN) stores the notified user identifier, first position number, and second position number in association with one another.

5 Claims, 9 Drawing Sheets

U.S. PATENT DOCUMENTS

| | | |
|---|---|---|
| 2005/0070283 A1 | 3/2005 | Hashimoto et al. |
| 2008/0102794 A1 | 5/2008 | Keevill et al. |
| 2008/0188221 A1 | 8/2008 | Hashimoto et al. |
| 2008/0254833 A1 | 10/2008 | Keevill et al. |
| 2008/0304439 A1 | 12/2008 | Keevill et al. |
| 2008/0304494 A1 | 12/2008 | Yokoyama |
| 2009/0017864 A1 | 1/2009 | Keevill et al. |

FOREIGN PATENT DOCUMENTS

| | | | |
|---|---|---|---|
| JP | 2005-109570 A | * | 4/2005 |
| WO | 2007 015071 | | 2/2007 |

* cited by examiner

FIG. 2

LOCATION NUMBER TABLE #1

| CELL IDENTIFIER | DUMMY LOCATION NUMBER |
|---|---|
| #1 | 0xFFF1 |
| #2 | 0xFFF2 |
| #3 | 0xFFF3 |
| #4 | 0xFFF4 |

FIG. 3A

LOCATION NUMBER TABLE #2

| CELL IDENTIFIER | REAL LOCATION NUMBER |
|---|---|
| #1 | 0x0001 |
| #2 | 0x0001 |
| #3 | 0x0002 |
| #4 | 0x0002 |

FIG. 3B

REVERSE LOOKUP LOCATION NUMBER TABLE

| REAL LOCATION NUMBER | CELL IDENTIFIER |
|---|---|
| 0x0001 | #1 |
|  | #2 |
| 0x0002 | #3 |
|  | #4 |

FIG. 5

LOCATION REGISTRATION TABLE

| USER IDENTIFIER | REAL LOCATION NUMBER | DUMMY LOCATION NUMBER |
|---|---|---|
| UE#1 | 0x0001 | 0xFFF1 |
| ⋮ | ⋮ | ⋮ |

FIG. 6

RNC IDENTIFICATION TABLE

| REAL LOCATION NUMBER | RNC IDENTIFIER |
|---|---|
| 0x0001 | RNC#1 |
| ⋮ | ⋮ |

FIG. 10A

LOCATION NUMBER TABLE

| CELL IDENTIFIER | LOCATION NUMBER |
|---|---|
| #1 | 0x0001 |
| #2 | 0x0001 |
| #3 | 0x0002 |
| #4 | 0x0002 |

FIG. 10B

REVERSE LOOKUP LOCATION NUMBER TABLE

| LOCATION NUMBER | CELL IDENTIFIER |
|---|---|
| 0x0001 | #1 |
| 0x0001 | #2 |
| 0x0002 | #3 |
| 0x0002 | #4 |

FIG. 11

LOCATION REGISTRATION TABLE

| USER IDENTIFIER | LOCATION NUMBER |
|---|---|
| UE#1 | 0x0001 |
| ⋮ | ⋮ |

FIG. 12

RNC IDENTIFICATION TABLE

| LOCATION NUMBER | RNC IDENTIFIER |
|---|---|
| 0x0001 | RNC#1 |
| ⋮ | ⋮ |

POSITION REGISTERING METHOD, RADIO CONTROL STATION, AND EXCHANGE

TECHNICAL FIELD

The present invention relates to a location registration method for a mobile station, a radio control station, and an exchange in a mobile communication system.

BACKGROUND ART

In recent years, a mobile communication system called a W-CDMA (Wideband-Code Division Multiple Access) system or a UMTS (Universal Mobile Telecommunications System) based on a code division multiple access (Code Division Multiple Access: CDMA) technique has been proposed and specified by the 3GPP (3rd Generation Partnership Projects).

FIG. 8 shows a configuration example of a W-CDMA system. The W-CDMA system includes a mobile station UE (User Equipment), radio base stations NodeB, a radio control station RNC (Radio Network Controller), and an exchange MSC/SGSN (Mobile Switching Center/Serving GPRS Support Node), thereby constituting a cellular mobile communication system.

An area called a cell (Cell) that defines a control unit in the cellular system is formed by a radio wave sent by each radio base station NodeB.

Here, in the W-CDMA system, multiple radio control stations RNC and multiple exchanges MSC/SGSN usually exist and are connected to one another. However, the single radio control station RNC and the single exchange MSC/SGSN are only shown in the example of FIG. 8 for the purpose of simplification.

In addition, the W-CDMA system is usually equipped with a device called a home memory to store subscriber information therein, apart from the exchange MSC/SGSN. However, a function of the home memory is assumed to be included in the exchange MSC/SGSN in the example of FIG. 8 similarly for the purpose of simplification.

Moreover, in the W-CDMA system, a mobile station UE which is turned on but not performing communication, i.e., which is in a standby state of waiting for a call originating action through a terminal operation by a user or for reception of an incoming call, measures an electric field in a pilot channel sent by the radio base station NodeB and autonomously selects an optimal pilot channel. Here, a selection algorithm is not related to the present invention and description thereof is omitted.

Then, the mobile station UE which selects the optimal pilot channel, namely the cell, reads notification information regarding the cell and turns into standby.

The mobile station UE executes location registration processing for getting ready to standby. FIG. 9 shows a sequence of the location registration processing and call processing according to the conventional technology.

As shown in FIG. 9, in step S2001, the radio control station RNC refers to a location number table (see FIG. 10(a)) and extracts location information "0x0001" by using a cell identifier "#1" as key information, and transmits notification information (SYSTEM INFORMATION) containing the extracted location number "0x0001" to a cell #1 identified by the cell identifier "#1".

In step S2002, the mobile station UE located in the cell #1 receives the notification information containing the location number "0x0001" and determines whether or not the location number "0x0001" matches a location number stored in the mobile station UE.

When the numbers match each other, the mobile station UE continues standby in the cell #1 in step S2003.

When the numbers do not match each other, the mobile station UE establishes a radio link with the radio control station RNC in step S2004 and transmits a location registration request (ROUTING AREA UPDATE REQUEST) to the radio control station RNC in step S2005.

Here, the radio control station RNC refers to the location number table (see FIG. 10(a)) and extracts the location number "0x0001" by using, as the key information, the cell identifier "#1" for identifying the cell #1 being an originator of the received location registration request, and notifies the exchange MSC/SGSN of the extracted location number "0x0001" and a user identifier "UE#1" for identifying the mobile station UE.

The exchange MSC/SGSN executes authentication processing for the mobile station UE in step S2006. When the authentication processing is successful, the exchange MSC/SGSN transmits a location registration acceptance signal (ROUTING AREA UPDATE ACCEPT) containing the location number "0x0001" to the mobile station UE in step S2007.

The mobile station UE stores the location number "0x0001" contained in a received location registration completion response in step S2008, and transmits a location registration completion signal (ROUTING AREA UPDATE COMPLETE) to the exchange MSC/SGSN in step S2009.

In step S2010, the exchange MSC/SGSN registers the location number "0x0001" and the user identifier "UE#1" identifying the mobile station UE, in association with each other.

In step S2011, the radio link between the mobile station UE and the radio control station RNC is released.

Thereafter, in step S2012, upon receipt of an incoming call signal addressed to the mobile station UE, the exchange MSC/SGSN refers to a location registration table (see FIG. 11), extracts the location number "0x0001" by using the user identifier "UE#1" contained in the incoming call signal as key information, refers to a RNC identification table, and extracts a RNC identifier "RNC#1" by using the extracted location number "0x0001" as key information.

Then, the exchange MSC/SGSN transmits a paging request (PAGING REQUEST) containing the extracted location number "0x0001" to the radio control station RNC identified by the extracted RNC identifier "RNC#1".

In step S2013, the radio control station RNC refers to a reverse lookup location number table (see FIG. 10(b)) and extracts the cell identifier "#1" by using the location number "0x0001" contained in the received paging request as key information.

Then, the radio control station RNC transmits a paging signal (PAGING) to the cell #1 which is identified by the cell identifier "#1".

In accordance with the sequence described above, the radio control station RNC can avoid transmission of a paging signal to cells #2 to #4, identified by cell identifiers #2 to #4, where the mobile station UE is not located.

Specifically, the location registration processing aims to enable restriction of the cell to which the paging signal is transmitted at the time of call processing.

An area formed by a group of cells set with the same location number is called a "location registration area". A large amount of the call processing occurs when the location registration area is too large. On the other hand, a large amount of the location registration processing occurs when the location registration area is too small. Accordingly, the location registration area is usually optimized by considering a balance of a trade-off relationship between an increase in traffic due to the call processing and an increase in load due to the location registration processing.

Meanwhile, as another type of the radio base station, very small radio base stations (hereinafter a "femto radio base station") mainly to cover an indoor space are increasingly introduced in addition to a public radio base station covering an outdoor space.

In addition, there has been studied a limited user service which forms a private area (formed of single or multiple cells) dedicated for a specific user to offer the specific user a special billing system in the area and additional functions available only in the area. Here, to form the private area, the femto radio base stations are installed in standard homes, small offices or the like, then are adjusted to minimize their coverage area and are connected to the radio control station RNC by using an inexpensive home IP line.

This limited user service, however, is subjected to a risk that the service performance for the specific user in the cells forming the area may be unintentionally degraded due to congestion caused by mobile stations of an unspecified number of users being on standby or performing communication in the cells. To avoid this risk in offering the limiter user service, one of conceivable ways is to assign different location numbers to all the cells to impose each mobile station to always perform the location registration processing when making a cell selection, and thereby to determine whether or not to allow the mobile station to turn into standby along with the location registration processing.

However, in this case, there is a problem of needing an enormous amount of the location numbers as the key information in the reverse lookup location number table. This is because all the location numbers "0x0001" to "0x0004" corresponding to cell identifiers #1 to #4 are different from one another as shown in FIG. 10, and because numerous femto radio base stations with small capacities usually exist.

SUMMARY OF THE INVENTION

The present invention has been made in view of the foregoing problem and an object thereof is to provide a location registration method, a radio control station, and an exchange, which are capable of avoiding a situation of needing an enormous amount of location numbers as key information for a reverse lookup location number table, while employing different location numbers respectively for all the cells managed by femto radio base stations.

A first aspect of the present invention is summarized as a location registration method for a mobile station in a mobile communication system, wherein a radio control device manages a cell identifier, a first location number and a second location number in association with each other, an exchange manages a user identifier, the first location number, the second location number, and a radio control station identifier in association with each other, and the method comprise causing the radio control station to extract the first location number by using the cell identifier as key information, and to transmit notification information containing the extracted first location number to a cell identified by the cell identifier, causing the mobile station to transmit a location registration request when the first location number contained in the notification information is different from a location number stored in the mobile station, causing the radio control station to extract the first location number and the second location number by using, as key information, the cell identifier identifying the cell being an originator of the location registration request, and to notify the exchange of the extracted first location number, the extracted second location number, and the user identifier identifying the mobile station, causing the exchange to perform location registration processing for the mobile station by storing the notified user identifier, the notified first location number and the notified second location number in association with each other, causing the exchange to extract the second location number by using the user identifier contained in an incoming call signal as key information, to extract the radio control station identifier by using the extracted second location number as key information, and to notify the radio control station identified by the extracted radio control station identifier of the user identifier and the second location number and causing the radio control station to extract the cell identifier by using the notified second location number as key information, and to transmit a paging signal containing the notified user identifier to the cell identified by the extracted cell identifier.

In the first aspect, the location registration method further comprise causing the radio base station to acquire a location number contained in notification information of a surrounding cell, and to report the location number to the radio control station and causing the radio control station to set a location number different from the reported location number, as the first location number of a cell subordinate to the radio base station.

A second aspect of the present invention is summarized as a radio control station, wherein a cell identifier, a first location number and a second location number are managed in association with each other, the first location number is extracted by using the cell identifier as key information, and notification information containing the extracted first location number is transmitted to a cell identified by the cell identifier, the first location number and the second location number are extracted by using, as key information, the cell identifier identifying the cell being an originator of a location registration request received from a mobile station, and a notification of the extracted first location number, the extracted second location number, and a user identifier identifying the mobile station is issued to an exchange and the cell identifier is extracted by using the second location number notified from the exchange as key information, and a paging signal containing the user identifier notified from the exchange is transmitted to the cell identified by the extracted cell identifier.

In the second aspect, wherein when the radio base station acquires a location number contained in notification information of a surrounding cell and reports the location number to the radio control station, the radio control station sets a location number different from the reported location number, as the first location number of a cell subordinate to the radio base station.

A third aspect of the present invention is summarized as an exchange, wherein a user identifier, a first location number, a second location number, and a radio control station identifier are managed in association with each other, location registration processing for a mobile station identified by the user identifier is performed by storing the user identifier and the first location number and the second location number, which are notified from a radio control station, in association with each other, and the second location number is extracted by using the user identifier contained in an incoming call signal as key information, the radio control station identifier is extracted by using the extracted second location number as key information, and a notification of the user identifier and the second location number is issued to the radio control station identified by the extracted radio control station identifier.

BRIEF DESCRIPTION OF THE DRAWINGS

FIG. 2 is a view showing an example of a location number table #1 managed by the radio control station according to the first embodiment of the present invention.

FIG. 3 is a view showing examples of a location number table #2 and a reverse lookup location number table managed by the radio control station according to the first embodiment of the present invention.

FIG. 5 is a view showing an example of a location registration table managed by the exchange according to the first embodiment of the present invention.

FIG. 6 is a view showing an example of a RNC identification table managed by the exchange according to the first embodiment of the present invention.

FIG. 10 is a view showing an example of a location number table managed by a radio control station in the general mobile communication system.

FIG. 11 is a view showing an example of a location registration table managed by an exchange in the general mobile communication system.

FIG. 12 is a view showing an example of a RNC identification table managed by the exchange in the general mobile communication system.

BEST MODES FOR CARRYING OUT THE INVENTION

Figure 8:
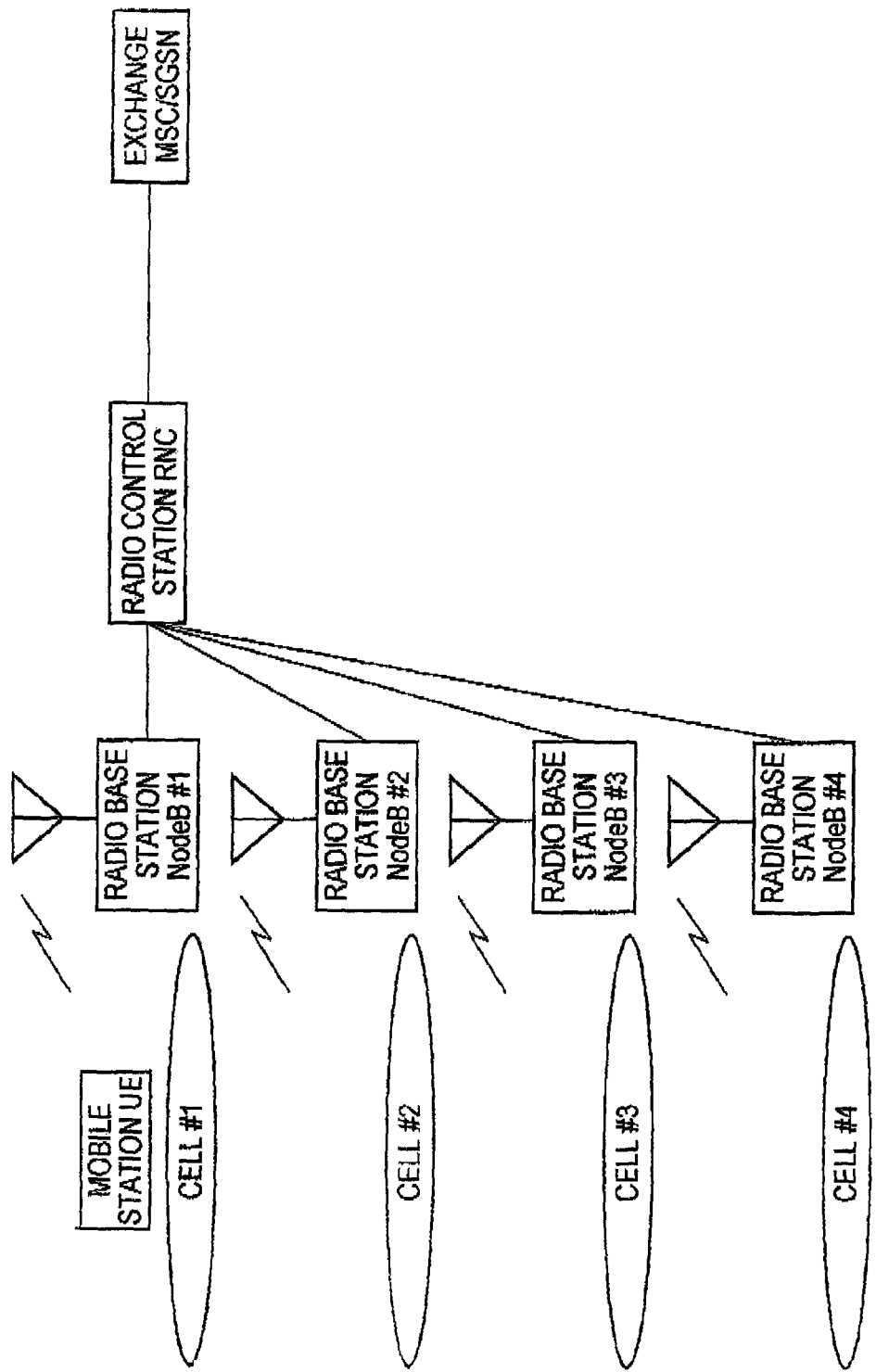
FIG. 8 is a view sowing a configuration of a general mobile communication system.
Figure 9:
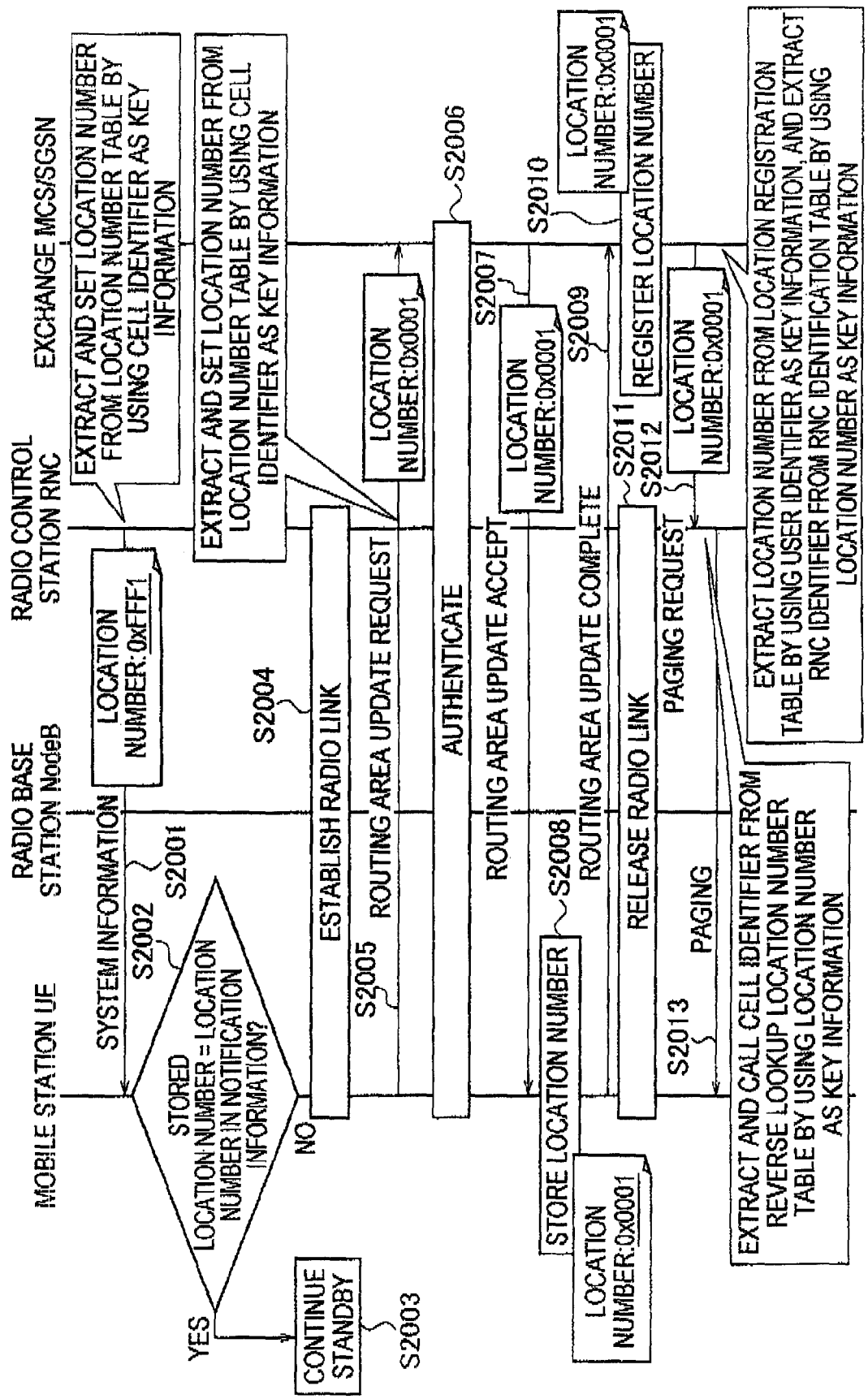
FIG. 9 is a sequence diagram for explaining location registration processing and incoming call processing in the general mobile communication system.

Configuration of Mobile Communication System According to First Embodiment of Present Invention A configuration of a mobile communication system according to a first embodiment of the present invention will be described with reference to FIG. 1 to FIG. 6. Note that an overall configuration of a mobile communication system according to this embodiment is identical to the above-described overall configuration of the mobile communication system shown in FIG. 8. Here, as similar to the conventional technology, multiple exchanges MSC/SGSN (MME) are usually provided and connected to one another, and a device called a home memory configured to store subscriber information is usually provided apart from the exchange MSC/SGSN. Note that a function of the home memory may be included in the exchange MSC/SGSN.

Figure 1:
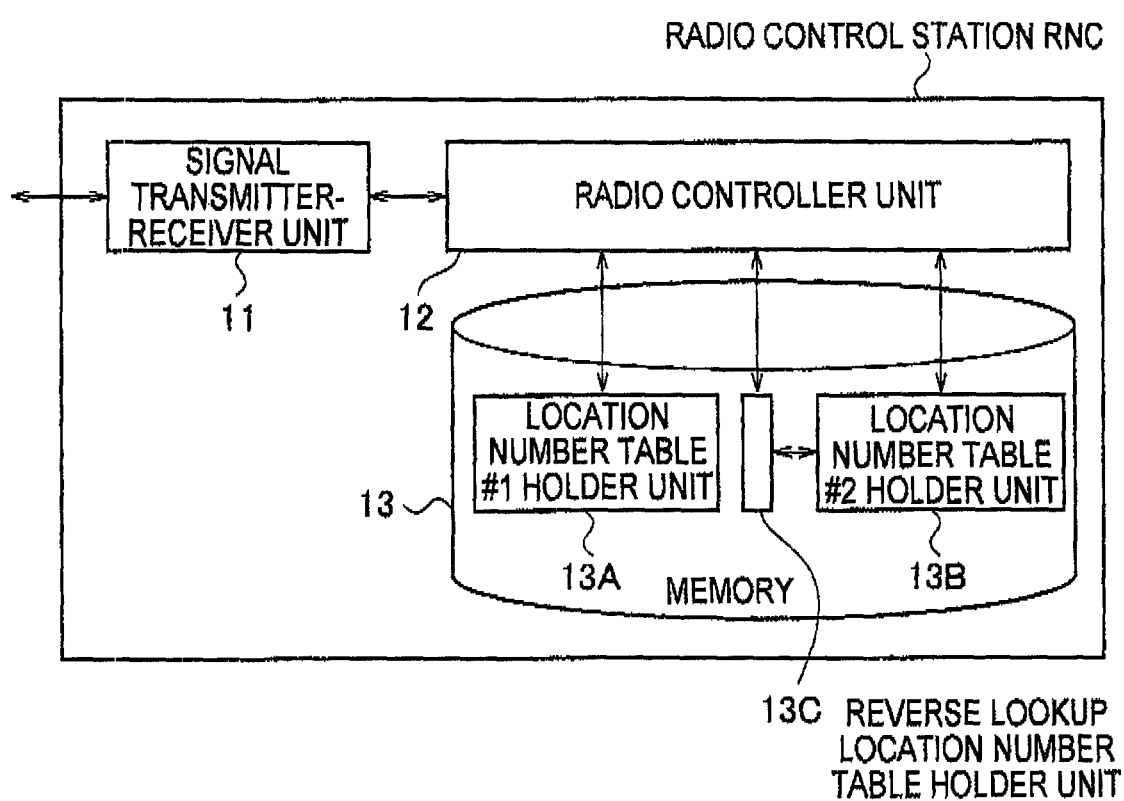
FIG. 1 is a functional block diagram of a radio control station according to a first embodiment of the present invention.

As shown in FIG. 1, a radio control station RNC includes a signal transmitter-receiver 11, a radio controller 12, and a memory 13.

The signal transmitter-receiver 11 is configured to perform transmission and reception of signals with a mobile station UE, a radio base station NodeB, and an exchange MSC/SGSN.

The radio controller 12 is configured to perform radio control processing concerning the mobile station UE and the radio base station NodeB.

The memory 13 includes a location number table #1 holder 13A, a location number table #2 holder 13B, and a reverse lookup location number table holder 13C.

As shown in FIG. 2, the location number table #1 holder 13A is configured to hold a location number table #1 for linking a "cell identifier" with a "dummy location number (first location number)", i.e., for extracting the "dummy location number (first location number)" by using the "cell identifier" as key information.

As shown in FIG. 3(a), the location number table #2 holder 13B is configured to hold a location number table #2 for linking a "cell identifier" with a "real location number (second location number)", i.e., for extracting the "real location number (second location number)" by using the "cell identifier" as key information.

As shown in FIG. 3(b), the reverse lookup location number table holder 13C is configured to hold a reverse lookup location number table for linking a "real location number (second location number)" with a "cell identifier", i.e., for extracting the "cell identifier" by using the "real location number (second location number)" as key information.

As described above, the memory 13 is configured to manage the cell identifier, the first location number and the second location number in association with each other by use of the location number table #1, the location number table #2, and the reverse lookup location number table.

Here, the "real location number (second location number)" needs to be unique in the entire mobile communication system, whereas the "dummy location number (first location number)" only needs to be unique inside the predetermined area and does not have to be unique in the entire mobile communication system. That is, the "dummy location number (first location number)" can be used repeatedly in each predetermined area.

To be more precise, the radio base station NodeB may be configured to acquire a location number contained in notification information in a surrounding cell and to report the location number to the radio control station RNC, and the radio control station RNC may be configured to set a different location number from the reported location number as the "dummy location number (first location number)" in the cell which is subordinate to the radio base station NodeB.

Note that the above-described predetermined areas are preferably away from each other by a sufficient distance so as to make it difficult for the mobile station UE to move continuously without turning the power off.

Figure 4:
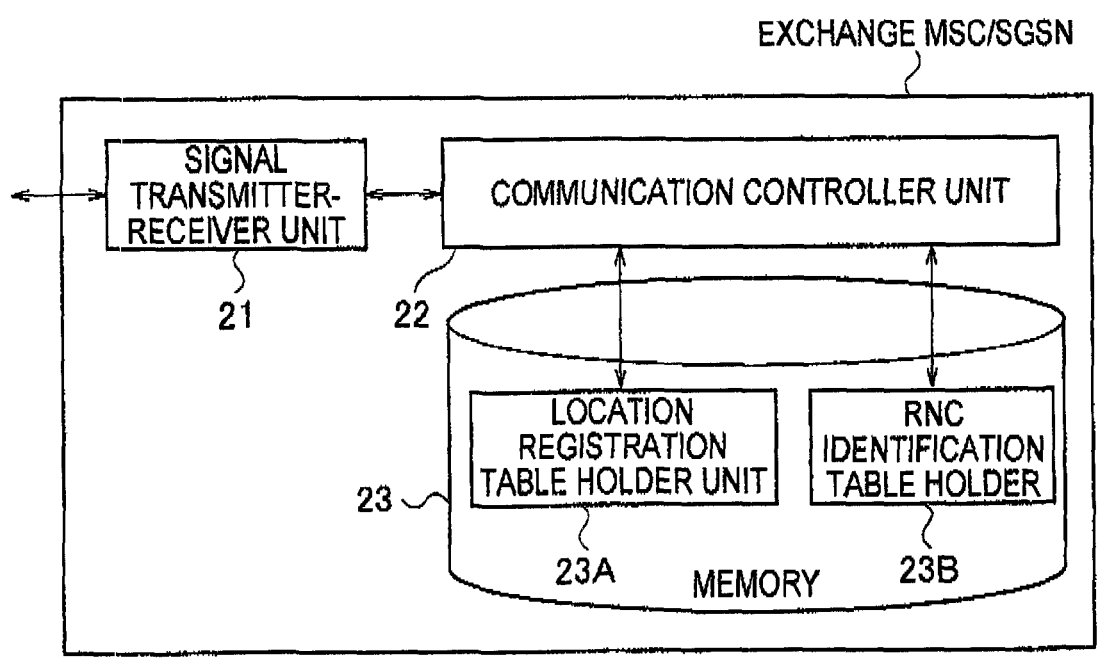
FIG. 4 is a functional block diagram of an exchange according to the first embodiment of the present invention.

As shown in FIG. 4, the exchange MSC/SGSN includes a signal transmitter-receiver 21, a communication controller 22, and a memory 23.

The signal transmitter-receiver 21 is configured to perform transmission and reception of signals with the radio control station RNC.

The communication controller 22 is configured to perform radio control processing concerning the mobile station UE.

The memory 23 includes a location registration table holder 23A, and a RNC identification table holder 23B.

As shown in FIG. 5, the location registration table holder 23A is configured to hold a location registration table for linking a "cell identifier" with a "dummy location number (first location number)" and a "real location number (second location number)", i.e., for extracting the "real location number (second location number)" by using the "cell identifier" as key information.

As shown in FIG. 6, the RNC identification table holder 2333 is configured to hold a RNC identification table for linking a "real location number (second location number)" with a "RNC identifier (radio controller identifier)", i.e., for extracting the "RNC identifier (radio controller identifier)" by using the "real location number (second location number)" as key information.

Operations of Mobile Communication System According to First Embodiment of Present Invention Operations of the mobile communication system according to the first embodiment of the present invention will be described with reference to FIG. 7. Specifically, location registration processing and call processing in the mobile communication system according to this embodiment will be described with reference to FIG. 7.

Figure 7:
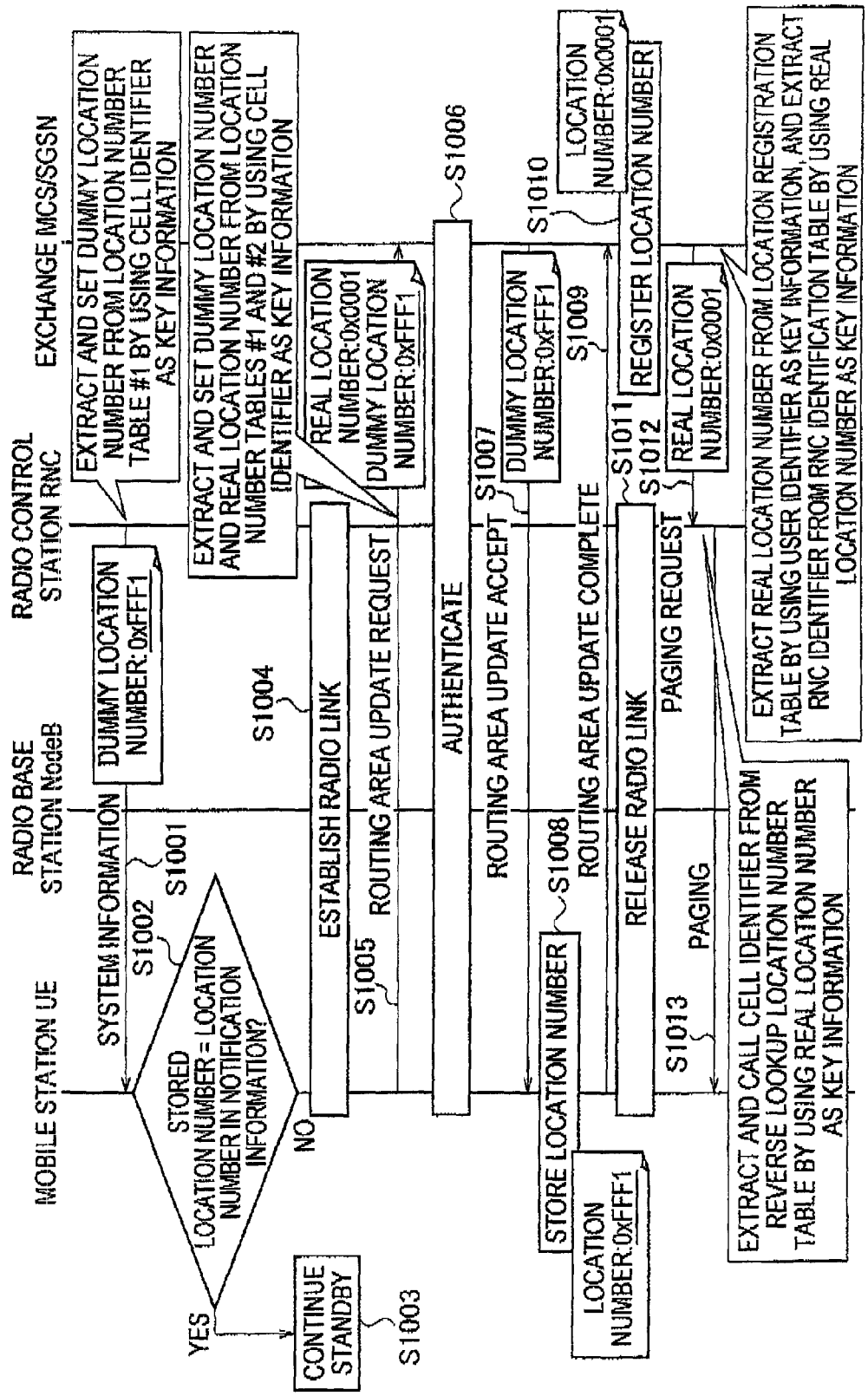
FIG. 7 is a sequence diagram for explaining location registration processing and incoming call processing in a mobile communication system according to the first embodiment of the present invention.

As shown in FIG. 7, in step S1001 and in step S2001, the radio control station RNC refers to a location number table #1 (see FIG. 2) and extracts dummy location information (first location number) "0xFFF1" by using a cell identifier "#1" as key information, and transmits notification information (SYSTEM INFORMATION) containing the extracted dummy location information (first location number) "0xFFF1" to a cell #1 identified by the cell identifier "#1".

In step S1002, the mobile station UE located in the cell #1 receives the notification information containing the dummy location information (first location number) "0xFFF1" and determines whether or not the dummy location information (first location number) "0xFFF1." matches a location number stored in the mobile station UE.

When the numbers match each other, the mobile station UE continues standby in the cell #1 in step S1003.

When the numbers do not match each other, the mobile station UE establishes a radio link with the radio control station RNC in step S1004 and transmits a location registration request (ROUTING AREA UPDATE REQUEST) to the radio control station RNC in step S1005.

Here, the radio control station RNC refers to the location number table #1 (see FIG. 2) and extracts the dummy location information (first location number) "0xFFF1" by using, as key information, the cell identifier "#1" identifying the cell #1 which is an originator of the received location registration request. Moreover, the radio control station RNC refers to the location number table #2 (see FIG. 3(a)) and extracts the real location information (second location number) "0x0001" by using, as key information, the cell identifier "#1" identifying the cell #1 which is the originator of the received location registration request.

Then, the radio control station RNC notifies the exchange MSC/SGSN of the extracted dummy location information (first location number) "0xFFF1", the extracted real location information (second location number) "0x0001", and a user identifier "UE#1" identifying the mobile station UE.

The exchange MSC/SGSN executes authentication processing concerning the mobile station UE in step S1006. When the authentication processing is successful, the exchange MSC/SGSN transmits a location registration acceptance signal (ROUTING AREA UPDATE ACCEPT) containing the dummy location information (first location number) "0xFFF1" to the mobile station UE in step S1007.

The mobile station UE stores the dummy location information (first location number) "0xFFF1" contained in a received location registration completion response in step S1008, and transmits a location registration completion signal (ROUTING AREA UPDATE COMPLETE) to the exchange MSC/SGSN in step S1009.

In step S1010, the exchange MSC/SGSN performs the location registration processing for the mobile station UE identified by the user identifier "UE#1" by registering the dummy location information (first location number) "0xFFF1", the real location information (second location number) "0x0001", and the user identifier "UE#1" identifying the mobile station UE to the location registration table in association with each other.

In step S1011, the radio link between the mobile station UE and the radio control station RNC is released.

Thereafter, in step S1012, upon receipt of an incoming call signal addressed to the mobile station UE, the exchange MSC/SGSN refers to a location registration table (see FIG. 5), extracts the real location information (second location number) "0x0001" by using the user identifier "UE#1" contained in the incoming call signal as key information, refers to a RNC identification table, and extracts a RNC identifier "RNC#1" by using the extracted real location information (second location number) "0x0001" as key information.

Then, the exchange MSC/SGSN transmits a paging request (PAGING REQUEST) containing the extracted real location information (second location number) "0x0001" to the radio control station RNC identified by the extracted RNC identifier "RNC#1".

In step S1013, the radio control station RNC refers to a reverse lookup location number table (see FIG. 3(b)) and extracts the cell identifier "#1" by using the real location information (second location number) "0x0001" contained in the received paging request as key information.

Then, the radio control station RNC transmits a paging signal (PAGING) to the cell #1 which is identified by the cell identifier "#1".

Advantageous Effect of Mobile Communication System According to First Embodiment of Present Invention According to the mobile communication system of the first embodiment of the present invention, the dummy location number (first location number) is allocated to the cell (the femto cell) to be managed by the femto radio base station. Hence it is possible to distinguish all the location numbers of the cells (the femto cells) to be managed by the femto radio base stations.

Moreover, the real location number (second location number) that can be allocated in common to multiple cells is used as the key information in the reverse lookup table used in incoming call processing (the call processing) of the mobile station UE. Hence it is possible to reduce a processing load on the radio control station RNC when making reference to the reverse lookup table in the incoming call processing (the call processing) of the mobile station UE.

Modified Example

Although the foregoing embodiment has described the mobile communication system of the W-CDMA mode as the example, the present invention is not limited to this mobile communication system. For example, the present invention is also applicable to a mobile communication system of a LTE (Long Term Evolution) mode.

In this case, the functions of the mobile base station NodeB and the functions of the radio control station RNC described above are loaded on either a radio base station eNB or an exchange (MME). In this modified example, the exchange MME is configured to play a role of the above-described network device.

In the mobile communication system of the LTE mode according to this modified example, the radio control station RNC and the radio base station NodeB described above are structured by use of the same device (the radio base station eNB).

Note that operation of the above described mobile station UE, the radio base station NodeB (eNB), the exchange MME, and the radio control station RNC may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the radio base station Nodes (eNB), the exchange MSC/SGSN (MME), and the radio control station RNC. Also, the storage medium and the processor may be provided in the mobile station UE, the radio base station Nodes (eNB), the exchange MSC/SGSN (MME), the radio control station RNC and the like as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined, by the description of the scope of claims. Thus, what is described herein is for illustrative purpose, and has no intention whatsoever to limit the present invention.

INDUSTRIAL APPLICABILITY

As described above, according to the present invention, it is possible to provide a location registration method, a radio control station, and an exchange, which are capable of avoiding a situation to cause an enormous amount of location numbers as key information for a reverse lookup location number table while distinguishing all location numbers of cells to be managed by femto radio base stations.

The invention claimed is:

1. A location registration method for a mobile station in a mobile communication system, wherein a radio control station manages a cell identifier, a first location number and a second location number in association with each other, the first location number being used by the mobile station to identify a location of a cell within a location area, the location area being configured to include one or more cells and the first location number is unique only within the location area, the second location number being used by the radio control station to identify the location area, the second location number being unique to an entire mobile communication system, and an exchange manages a user identifier, the first location number, the second location number, and a radio control station identifier in association with each other, the method comprising the steps of:

causing the radio control station to extract the first location number by using the cell identifier as key information, and to transmit notification information containing the extracted first location number to a cell identified by the cell identifier;

causing the mobile station to transmit a location registration request when the first location number contained in the notification information is different from a location number stored in the mobile station, wherein the mobile station continues to operate in a standby mode when the first location number contained in the notification information matches the location number stored in the mobile station;

upon the radio control station receiving the location registration request, causing the radio control station to extract the first location number and the second location number by using, as key information, the cell identifier which identifies the cell being that is an originator of the location registration request, and to notify the exchange of the extracted first location number, the extracted second location number, and the user identifier identifying the mobile station;

causing the exchange to perform location registration processing for the mobile station by storing the notified user identifier, the notified first location number and the notified second location number in association with each other;

upon an incoming call signal, which contains the user identifier, being received at the exchange, causing the exchange to extract the second location number by using the user identifier contained in the incoming call signal as key information, to extract the radio control station identifier by using the extracted second location number as key information, and to notify the radio control station identified by the extracted radio control station identifier of the user identifier and the second location number; and causing the radio control station to extract the cell identifier by using the notified second location number as key information, and to transmit a paging signal containing the notified user identifier to the cell identified by the extracted cell identifier.

2. The location registration method according to claim 1, further comprising the steps of:

causing a radio base station to acquire a location number contained in notification information of a surrounding cell, and to report the location number to the radio control station; and causing the radio control station to set a location number different from the reported location number, as the first location number of a cell subordinate to the radio base station.

3. A radio control station, wherein a cell identifier, a first location number and a second location number are managed in association with each other, the radio control station comprising:

a controller configured to extract the first location number by using the cell identifier as key information; and a transmitter configured to transmit notification information containing the extracted first location number to a cell identified by the cell identifier, wherein upon the radio control station receiving a location registration request from a mobile station, the controller is configured to extract the first location number and the second location number by using, as key information, the cell identifier which identifies the cell that is an originator of the location registration request received from the mobile station, and the transmitter is configured to issue a notification of the extracted first location number, the extracted second location number, and a user identifier identifying the mobile station to an exchange, upon receiving an incoming paging signal, which contains the user identifier and the second location number, from the exchange, the controller is configured to extract the cell identifier by using the second location number notified from the exchange as key information, and the transmitter is configured to transmit an outgoing paging signal containing the user identifier notified from the exchange to the cell identified by the extracted cell identifier; and the first location number is used by the mobile station to identify a location of a cell within a location area, the location area being configured to include one or more cells and the first location number is unique only within the location area, the second location number being used by the radio control station to identify the location area, the second location number being unique to an entire mobile communication system.

4. The radio control station according to claim 3, wherein when a radio base station acquires a location number contained in notification information of a surrounding cell and reports the location number to the radio control station, the radio control station sets a location number different from the reported location number, as the first location number of a cell subordinate to the radio base station.

5. An exchange, wherein a user identifier, a first location number, a second location number, and a radio control station identifier are managed in association with each other, the exchange comprising:

a memory;

a controller configured to perform location registration processing for a mobile station identified by the user identifier by storing the user identifier and the first location number and the second location number, which are notified from a radio control station, in association with each other in the memory, and upon an incoming call signal, which contains the user identifier, being received at the exchange, the controller is configured to extract the second location number by using the user identifier contained in the incoming call signal as key information, and extract the radio control station identifier by using the extracted second location number as key information; and a transmitter configured to issue a notification of the user identifier and the second location number to the radio control station identified by the extracted radio control station identifier, wherein the first location number is used by the mobile station to identify a location of a cell within a location area, the location area being configured to include one or more cells and the first location number is unique only within the location area, the second location number being used by the radio control station to identify the location area, the second location number being unique to an entire mobile communication system.

* * * * *